Oct. 5, 1965     C. M. SCHABEN ETAL     3,210,127
PNEUMATIC CONVEYOR MACHINES HAVING SWIVEL CYCLONE SEPARATORS
Filed May 27, 1963     4 Sheets-Sheet 1
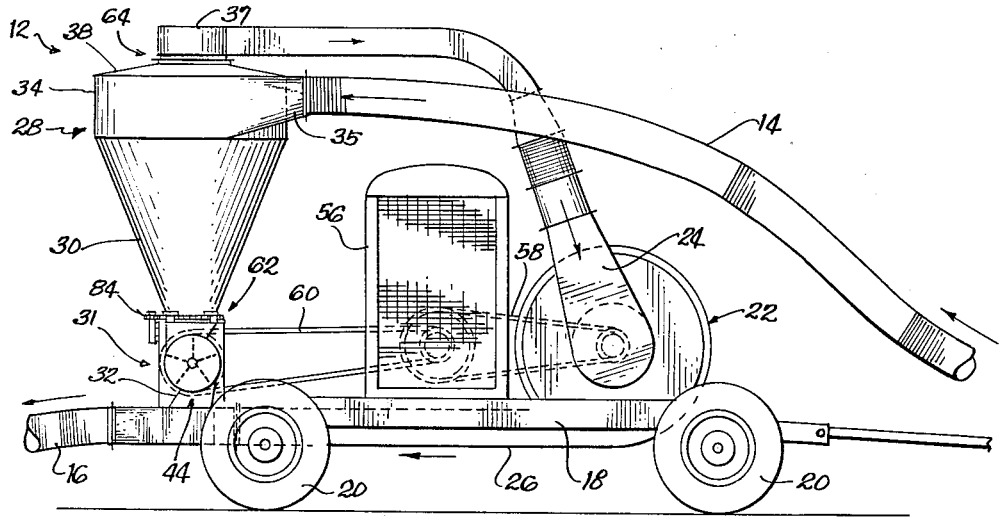
FIG. 1
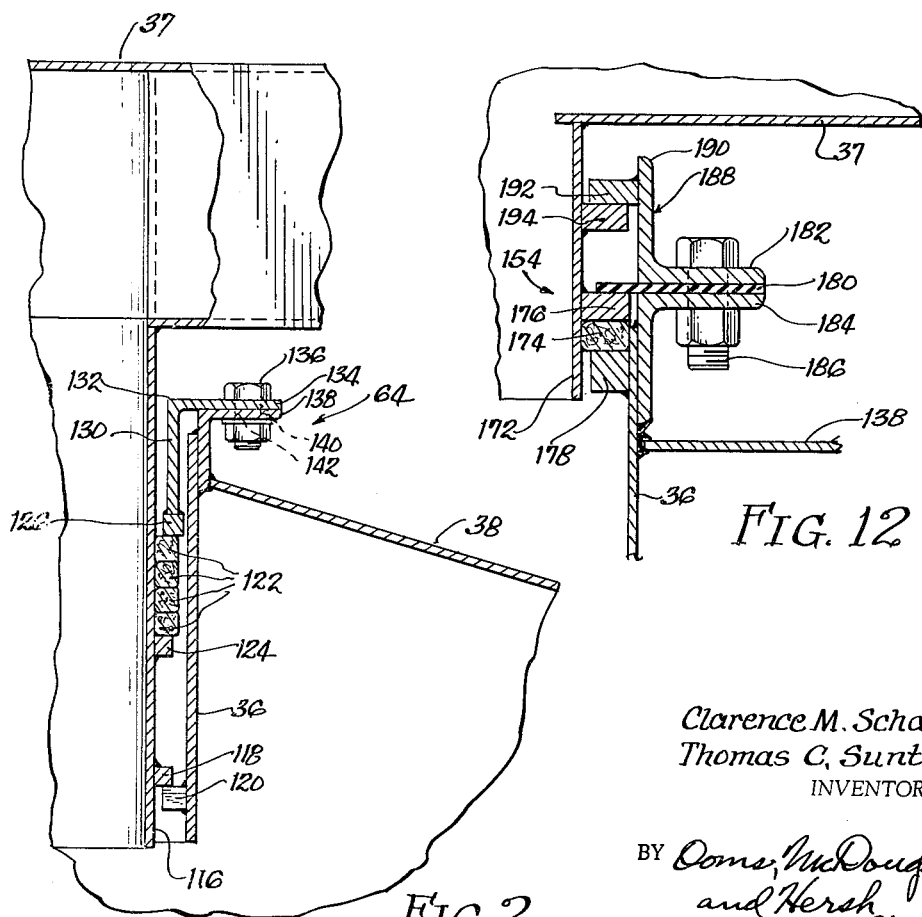
FIG. 2
FIG. 12
Clarence M. Schaben
Thomas C. Sunter
INVENTORS
BY Dorns, McDougall
and Hersh
Attys

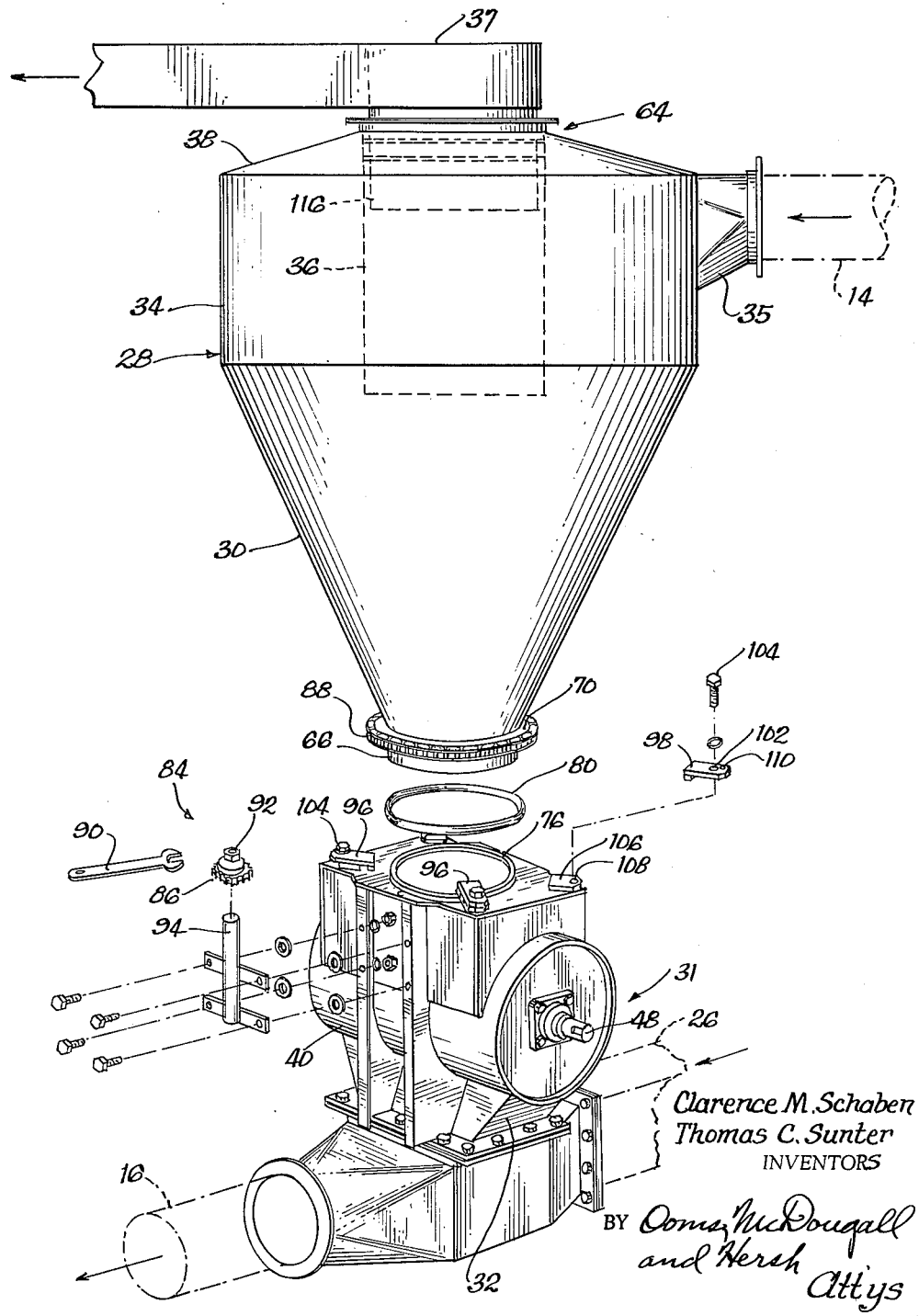

Oct. 5, 1965  C. M. SCHABEN ETAL  3,210,127
PNEUMATIC CONVEYOR MACHINES HAVING SWIVEL CYCLONE SEPARATORS
Filed May 27, 1963  4 Sheets-Sheet 3
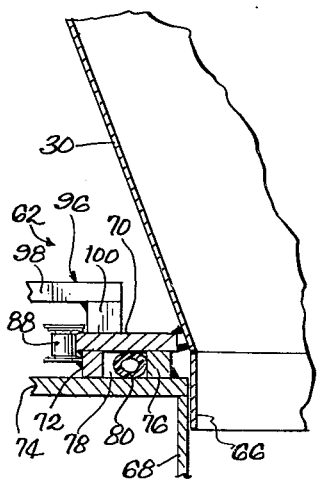
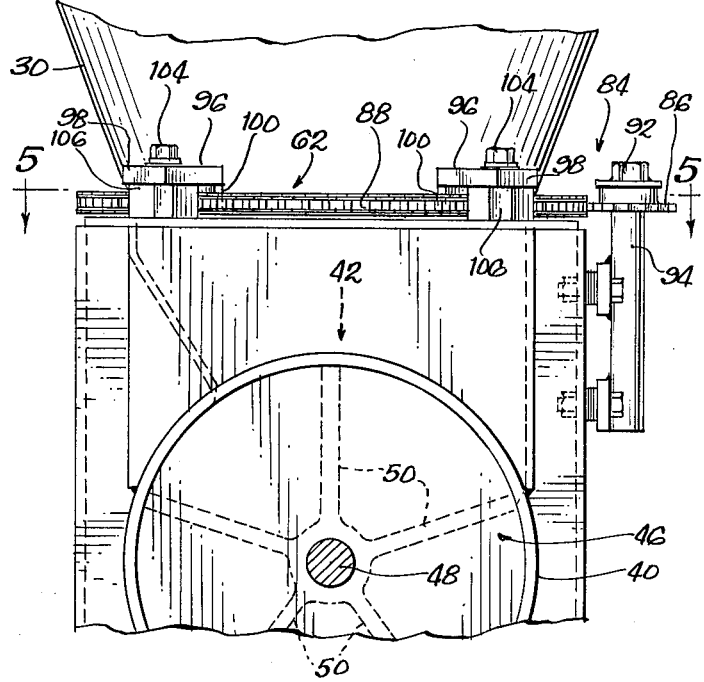
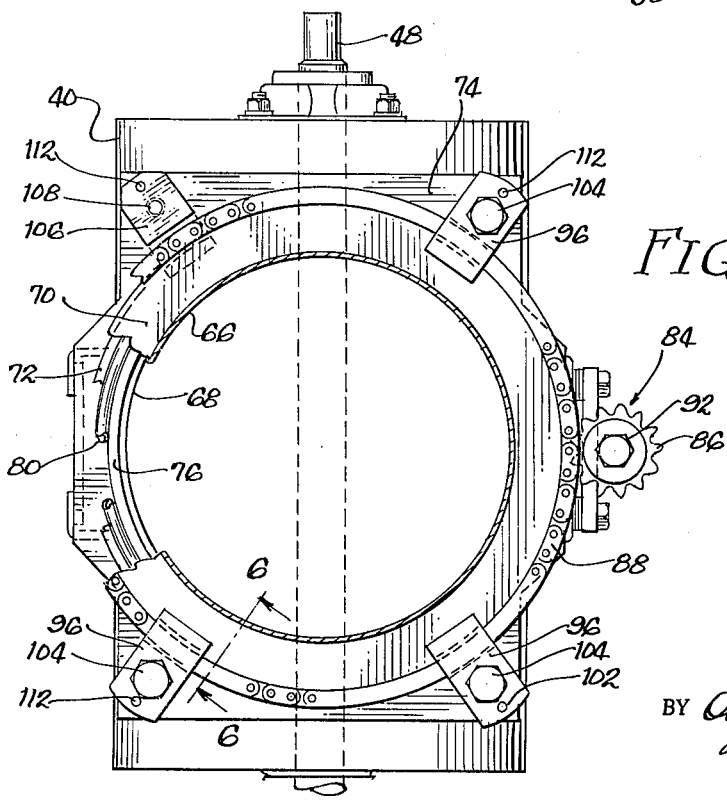
Clarence M. Schaben
Thomas C. Sunter
INVENTORS Oct. 5, 1965     C. M. SCHABEN ETAL     3,210,127
PNEUMATIC CONVEYOR MACHINES HAVING SWIVEL CYCLONE SEPARATORS
Filed May 27, 1963     4 Sheets-Sheet 4
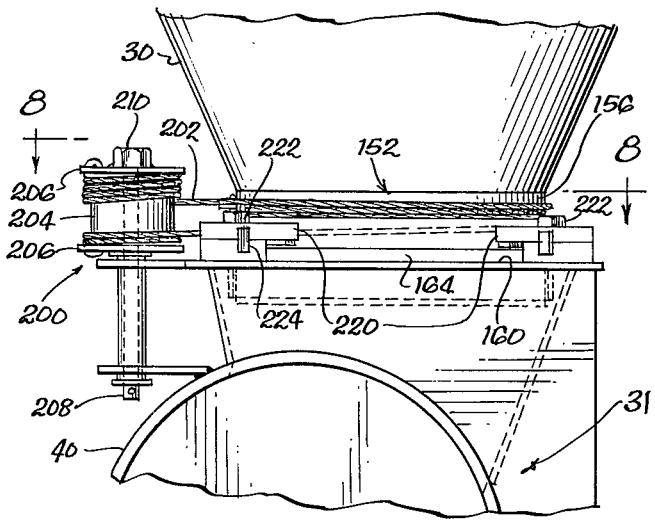
FIG. 7
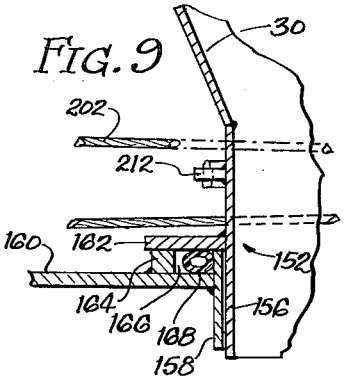
FIG. 9
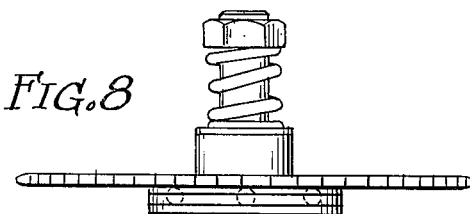
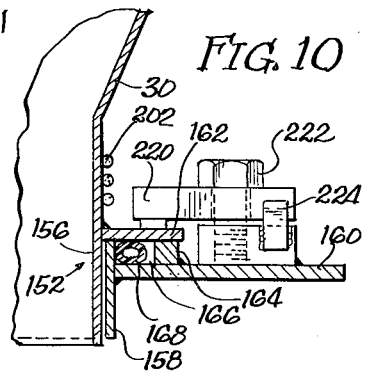
FIG. 10
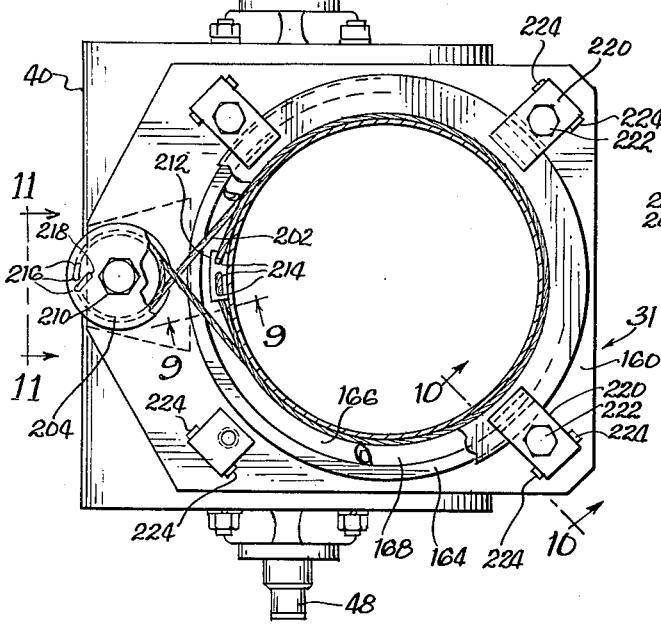
FIG. 8
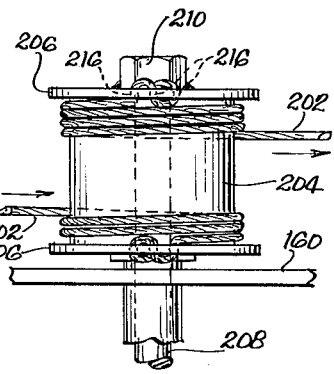
FIG. 11
Clarence M. Schaben
Thomas C. Sunter
INVENTORS
BY Ooms, McDougall
and Hersh
Attys United States Patent Office 3,210,127
Patented Oct. 5, 1965

3,210,127
PNEUMATIC CONVEYOR MACHINES HAVING SWIVEL CYCLONE SEPARATORS
Clarence M. Schaben, Elburn, and Thomas C. Sunter, Geneva, Ill., assignors to D. K. Manufacturing Company, Batavia, Ill., a corporation of Illinois
Filed May 27, 1963, Ser. No. 283,230
6 Claims. (Cl. 302—23)

This invention relates to pneumatic conveyor machines of the type adapted to suck up, convey, and discharge various granular, powdered, or finely divided materials, such as grain, for example.

One object of the present invention is to provide a new and improved machine of the type having a blower having its suction side connected to a cyclone separator adapted to separate the granular material from the incoming stream of air so that the granular material will not pass through the blower, the granular material being reintroduced into the outgoing stream of air from the blower by means of a rotary air lock valve or the like.

A further object is to provide a new and improved machine of the foregoing character in which the cyclone separator is adapted to be swiveled about its vertical axis so that the inlet air pipe leading to the separator may be turned in any direction, whereby the direction of the inlet pipe may be changed as necessary or desirable to provide the shortest and most convenient run of conduit or pipe between the source of granular material and the cyclone separator.

It is a further object to provide such a new and improved machine having a mechanism for swiveling the cyclone separator, together with means for locking the separator in any position to which it may be adjusted.

Another object is to provide a new and improved machine having means forming swivel joints between the lower end of the separator and the rotary feeder valve, and between the upper end of the separator and the pipe which leads to the suction side of the blower.

A further object is to provide such a new and improved machine having means for sealing the swivel joint to prevent leakage of air into the separator.

Another object is to provide a new and improved pneumatic conveyor machine of the foregoing character which is easy to adjust and economical in construction.

Further objects and advantages of the present invention will appear from the following description, taken with the accompanying drawings, in which:

FIG. 1 is a somewhat diagrammatic elevational view showing the over-all construction of a pneumatic conveyor machine to be described as an illustrative embodiment of the present invention.

FIG. 2 is a fragmentary enlarged sectional view taken vertically through the swivel joint between the cyclone separator of FIG. 1 and the conduit or plenum which leads to the suction side of the blower.

FIG. 3 is an exploded perspective view showing details of the swivel connection between the cyclone separator and the rotary feeder valve of FIG. 1.

FIG. 4 is a fragmentary elevational view showing the lower portion of the cyclone separator and the upper portion of the rotary feeder valve of FIG. 1.

FIG. 5 is a horizontal section taken generally along the line 5—5 in FIG. 4.

FIG. 6 is a fragmentary vertical section taken through the swivel joint between the cyclone separator and the feeder valve, generally along the line 6—6 in FIG. 5.

FIG. 7 is a fragmentary elevational view, somewhat similar to FIG. 4 but showing a modified swivel connection between the cyclone separator and the rotary feeder valve.

FIG. 8 is a horizontal section taken generally along the broken line 8—8 in FIG. 7.

FIGS. 9 and 10 are fragmentary vertical sections taken generally along the lines 9—9 and 10—10 in FIG. 8.

FIG. 11 is a fragmentary elevational view taken generally as indicated by the line 11—11 in FIG. 8.

FIG. 12 is a fragmentary elevational section somewhat similar to FIG. 2 but showing a modified swivel joint between the cyclone separator and the pipe leading to the blower.

As already indicated, FIG. 1 illustrates the general construction of a pneumatic or air-operated conveyor machine 12, adapted to suck up, convey, and discharge grain or various other granular, powdered or finely divided materials. The loose granular material is sucked into the machine through an inlet pipe 14 and is blown out of the machine through an outlet pipe 16. The machine is capable of blowing grain or other loose material to a considerable height and distance from the machine. In this case, the machine 12 is mounted on a frame 18 which is equipped with wheels 20 so that the machine will be fully and easily movable to any desired location. The machine 12 may be towed as a trailer behind any desired vehicle.

The airstream for carrying the grain or other granular material is produced by a blower, pump or fan 22. As shown, the blower 22 is of the rotary centrifugal type. It will be seen that the blower 22 has a suction or inlet pipe 24 and an exhaust or discharge pipe 26. In the illustrated construction, the discharge pipe 26 of the blower 22 is connected directly to the outlet pipe 16 of the machine. A cyclone separator 28 is connected between the inlet pipe 14 and the suction pipe 24 of the blower. The separator 28 is effective to separate the granular material from the incoming airstream, so that granular material is prevented from entering the blower 22. The separator 28 directs the air into the suction pipe 24 of the blower, while the granular material passes downwardly into a downwardly tapering hopper section 30 forming the lower portion of the separator 28. A rotary feeder valve or air lock 31 is connected between the lower end of the hopper 30 and a pipe or conduit 32 which leads into the discharge pipe 26 of the blower 22. Thus, the rotary feeder valve 31 is effective to feed the granular material from the hopper 30 into the discharge pipe 26 so that the granular material will be carried away by the airstream in the discharge pipe 26 and will be blown out of the machine through the outlet pipe 16.

It will be seen that the separator 28 is of the centrifugal or cyclone type having a generally cylindrical upper casing 34 having a tangential entrance conduit or stub 35 to which the inlet pipe 14 is connected. The tangential location of the entrance pipe causes the incoming stream of granular material and entraining air to whirl rapidly within the casing 34 as the granular material moves downward by gravity. The centrifugal effect of the whirling action forces the grain outwardly against the casing 34 and the inside of the hopper section 30. On the other hand, the air is drawn out of the separator 28 through a vertical pipe 36 which extends axially in a downward direction into the separator 28 through an upper wall 38 which is secured to the top of the cylindrical casing 34. A curved plenum pipe 37 is provided to connect the axial pipe 36 to the suction pipe 24 of the blower 22. The centrifugal force on the granular material prevents it from entering the lower end of the axial pipe 36.

The illustrated rotary feeder valve 31 comprises a cylindrical casing 40 arranged with its axis extending horizontally. The casing 40 has an inlet opening 42 at its upper side portion and an outlet opening 44 at its lower side portion. The inlet opening 42 connects with the lower end of the hopper 30 while the outlet opening 44 connects with the pipe or conduit 32 through which the grain is delivered to the exhaust pipe 26 of the blower 22.

As shown, the rotary feeder valve 31 comprises a rotary valve member 46 mounted on a rotatable shaft 48 which extends axially through the valve casing 40. The rotary valve member 46 is provided with a plurality of generally radial vanes or paddles 50 which normally rotate with the shaft 48. When the rotary feeder valve 31 is operating, the vanes 50 rotate in close proximity to the casing 40.

It will be evident that the rotation of the rotary valve member 46 produces a regulated flow of granular material from the hopper 30 into the discharge pipe 26. The rotary feeder valve acts as an air lock, to prevent the direct flow of the air from the discharge pipe 26 into the separator 28. It will be recalled that the outlet of the rotary feeder valve is connected to the discharge side of the blower 22 while the inlet of the valve is connected through the separator 28 to the suction side of the blower. Thus, there is a considerable air pressure differential between the outlet and the inlet of the valve 31. However, the vanes 50 fit closely enough within the cylindrical valve casing 40 to control and minimize the flow of air through the valve.

Power to drive the blower 22 is normally supplied by an engine or motor 56. A belt drive 58 may be employed between the motor 56 and the blower 22. In this case, a chain drive 60 is provided between the engine 56 and the rotary valve member 46 of the feeder valve 31. The drive 60 may be arranged to rotate the valve member 46 at a relatively low speed.

In accordance with the present invention, the cyclone separator 28 is mounted so that it may be rotated or swiveled about its own vertical axis, relative to the rotary feeder valve 31 and the plenum 37. Thus, a lower swivel joint 62 is provided between the lower end of the hopper 30 and the rotary feeder valve 31. An upper swivel joint 64 is provided between the upper end of the separator 28 and the plenum 37. As shown to advantage in FIG. 6, the lower end of the hopper 30 may be provided with a cylindrical pilot portion or stub 66, adapted to be rotatably received within a sleeve 68 on the rotary feeder valve 31. An outwardly projecting flange 70 may be welded or otherwise secured to the lower end of the hopper 30. As shown, a downwardly projecting ring 72 is welded or otherwise secured to the underside of the flange 70 near the outer edge thereof. The lower side of the ring 72 is adapted to bear against an upper horizontal wall 74, secured to the feeder valve 31. An upwardly projecting ring 76 may be welded or otherwise secured to the upper wall 74. As shown, the ring 76 is smaller than the ring 72 and is adapted to be received therein for engagement with the underside of the flange 70. An annular space 78 is formed between the rings 72 and 76 for receiving a sealing ring 80 which may be in the form of a hollow tube made of plastic or other suitable material. The sealing ring 80 is compressed between the flange 70 and the wall 74 to prevent leakage of air through the lower swivel joint 62.

A mechanism 84 is provided for turning the cyclone separator 28 so that the tangential inlet stub 35 may be aimed in any desired direction, without any necessity for moving the entire pneumatic conveyor machine 12. In this way, the direction of the inlet pipe 14 may be changed so as to provide the shortest and most convenient run of pipe between the source of the granular material and the cyclone separator. In this case, the adjusting mechanism 84 comprises a rotatable sprocket or toothed wheel 86 which meshes with a length of roller chain 88 welded or otherwise secured to the flange 70 on the hopper 30. It will be recognized that the chain 88 acts in the manner of a gear so that the cyclone separator 28 is turned when the sprocket 86 is rotated. An ordinary wrench 90 may be employed to turn the sprocket 86. To receive the wrench 90, the sprocket 86 is formed with a head 92 which is hexagonal or of some other suitable shape. The sprocket 86 is rotatable about a shaft 94 mounted on the feeder valve 31.

Means are provided to lock or retain the separator 28 in any position to which it may be adjusted. In this case, a plurality of clamps 96 are mounted on the upper wall 74 of the feeder valve 31 and are engageable with the upper side of the flange 70. Each of the illustrated clamps 96 comprises a plate or block 98 having a downwardly projecting lip or lug 100 for engaging the upper side of the flange 70. Each clamp 96 is formed with a hole 102 for receiving a clamping screw 104 threaded into a raised block or boss 106 which is secured to the upper wall 74 of the feeder valve 31. A threaded hole 108 is formed in each boss 106 for receiving the corresponding screw 104. To prevent the clamps 96 from turning, each clamp may be formed with a second hole 110 for receiving a pin 112 projecting upwardly from the corresponding boss 106.

To form the swivel joint 64 between the plenum 37 and the upper end of the cyclone separator 28, the plenum 37 is provided with a downwardly projecting cylindrical pilot or stub 116 which is received within the axial pipe 36 on the top wall 38 of the separator. The weight of the plenum 37 is transferred to the pipe 36 by an outwardly projecting ring 118 which is welded or otherwise secured to the pilot 116. The underside of the ring 118 is slidably engageable with a series of inwardly projecting lugs 120 welded or otherwise secured to the inside of the pipe 36. If desired, a continuous ring may be employed to support the ring 118.

In this case, the upper swivel joint 64 is sealed by packing material 122 which is positioned between the pipe 36 and the stub 116. The packing material 122 may comprise one or more wrappings of oiled felt or other suitable material. It will be seen that the packing 122 is confined between rings 124 and 126. The ring 124 is welded or otherwise secured to the outside of the pilot 116. The ring 126 is disposed above the ring 124 and is adapted to be removably mounted on the cyclone separator 28. In this case, the ring 126 is welded or otherwise secured to a downwardly projecting flange 130 on an angle member 132, which also has an outwardly projecting horizontal flange 134. For convenience, the ring 126 may be formed in a plurality of segments. By means of bolts 136, the flange 134 may be clamped downwardly against a bracket 138 welded or otherwise secured to the pipe 36 on the cyclone separator 28. Holes 140 and 142 may be formed in the flange 134 and the bracket 138 to receive the bolts 136. The tightening of the bolts 136 compresses the packing in an axial direction so that the packing prevents the leakage of air through the swivel joint 64.

During the operation of the pneumatic conveyor machine 12, the clamps 96 are tightened down so as to prevent any movement of the cyclone separator 28. When it is desired to change the direction of the inlet pipe 14, the clamps 96 are released by loosening the screws 104. The sprocket 86 is then rotated by engaging the wrench 90 with the head 92 of the sprocket. The gear action between the sprocket and the chain 88 causes the cyclone separator 28 to rotate. When the separator 28 has been turned to the desired position, the clamps 96 are again tightened down.

FIGS. 7–12 illustrate another embodiment having modified lower and upper swivel joints 152 and 154 at the lower and upper ends of the cyclone separator 28. At the lower swivel joint 152, a cylindrical pilot 156 is secured to the lower end of the hopper 30 and is received within a sleeve 158 on the feeder valve 31. As before, the feeder valve 31 has an upper horizontal wall 160. An outwardly projecting annular flange 162 is welded or otherwise secured to the cylindrical stub 156. The lower side of the flange 162 bears against an upwardly projecting ring 164 which is welded or otherwise secured to the horizontal wall 160. An annular space 166 is formed between the ring 164 and the pilot 156 for receiving an O-ring 168 made of rubber, synthetic rubber or plastic material. The O-ring 168 is in the form of a hollow circular tube. It will be seen that the O-ring is compressed between the flange 162 and the upper wall 160 so as to form an airtight seal.

At the upper swivel joint 154, the plenum 37 is provided with a downwardly projecting cylindrical pilot or stub 172 which is received within the axial pipe 36 on the cyclone separator 28. A packing ring 174 prevents leakage of air through the swivel joint 154. The packing ring 174 may be made of oiled felt or other suitable material. It will be seen that the packing ring 174 is compressed between the upper and lower rings 176 and 178. The lower ring is welded or otherwise secured to the inside of the axial pipe 36. As shown, the upper ring 176 projects outwardly from the pilot 172 and is welded or otherwise secured thereto.

A further seal is provided by a flat annular gasket 180 which engages the upper side of the ring 176 and is clamped between upper and lower flanges 182 and 184. The lower flange 184 is welded or otherwise secured to the axial pipe 36 on the separator 28. Bolts 186 may be employed to clamp the flanges 182 and 184 together.

The upper horizontal flange 182 is formed on a ring-shaped angle member 188 which also has an upstanding flange 190. An inwardly projecting ring 192 is welded or otherwise secured to the flange 190 and is engageable with an outwardly projecting ring 194 welded or otherwise secured to the pilot 172. The engagement between the rings 192 and 194 retains the plenum 37 on the separator 28. When the flanges 182 and 184 are clamped together by means of the bolts 186, the ring 192 presses downwardly on the ring 194 and causes the ring 176 to compress the packing 174 against the ring 178.

The second embodiment employs a modified mechanism 200 for rotating or swiveling the cyclone separator 28. As shown to advantage in FIG. 7, the mechanism 200 employs a cable or other tension element 202 which is wrapped around an actuating drum 204 and also around the upper portion of the cylindrical pilot 156 on the hopper 30. The actuating drum 204 has upper and lower flanges 206 for retaining the cable 202 on the drum. It will be seen that the drum 204 is rotatably supported by a shaft 208 mounted on the feeder valve 31. As before, the drum 204 is adapted to be turned by the use of a wrench which is engageable with a hexagonal or other suitable head 210 on the upper end of the drum.

The cable 202 is wrapped in the general form of a figure 8 around the drum 204 and the cylindrical pilot 156. The two ends of the cable 202 are anchored to the drum 204 while an intermediate point on the cable is anchored to a lug 212 on the cylindrical pilot 156. As shown, the lug 212 is formed with three holes 214 through which the intermediate portion of the cable is woven to provide a positive nonslipping connection between the cable and the lug. Similarly, each of the end flanges 206 on the drum 204 is formed with three holes 216 through which one end of the cable is woven back and forth to anchor the end of the cable to the drum. At each end of the drum 204, a fourth hole 218 is provided for receiving the loose end of the cable. Thus, the end of the cable is woven outwardly through the first hole 216, inwardly through the next hole, and outwardly through the third hole, and then is inserted into the hole 218.

As before, a plurality of clamping plates 220 are mounted on the upper wall 160 of the feeder valve 31 by means of clamping screws 220. The clamps 222 are adapted to be tightened down against the outwardly projecting flange 162 on the cyclone separator 28. In this case, each clamp 220 is prevented from rotating by providing a pair of upwardly projecting lugs 224 on the upper wall 160.

When the angle of the cyclone separator 28 is to be changed, the clamps 220 are released by loosening the screws 222. A wrench is engaged with the hexagonal head 210 and is employed to rotate the drum 204. The cable 202 is wound onto one end portion of the drum 204 and off the other end portion, with the result that the cyclone separator 28 is turned about its vertical axis. The inlet pipe 14 is thereby aimed in the desired direction. The clamps 220 are then tightened down again so as to lock the separator 28 against movement.

Various other modifications, alternative constructions and equivalents may be employed without departing from the true spirit and scope of the invention, as exemplified in the foregoing description and defined in the following claims.

We claim:

1. In a pneumatic conveyor machine,
the combination comprising a frame, a blower securely mounted on said frame and having suction and discharge connections,
an outlet pipe securely mounted on said frame and connected to said discharge connection,
a cyclone separator having a generally circular housing with a tangential inlet pipe for conducting air and granular material into said housing,
the granular material being separated from the air in said housing by centrifugal action,
said separator having a lower hopper portion for receiving the granular material,
said separator having an axial upwardly directed air outlet conduit,
a feeder valve securely mounted on said frame and connected between the lower end of said hopper portion and said outlet pipe for feeding the granular material into said outlet pipe,
said feeder valve having a discharge conduit securely connected to said outlet pipe,
a suction pipe connected between said suction connection of said blower and said outlet conduit of said separator,
an upper swivel joint between said suction pipe and said outlet conduit of said separator,
a lower swivel joint between said feeder valve and said hopper portion of said separator,
said lower swivel joint including a bearing on said feeder valve and rotatably supporting said hopper portion,
said separator being adapted to be turned about said swivel joints to change the direction of said inlet pipe,
and clamping means for locking said separator in any adjusted position.

2. The combination of claim 1,
in which said lower swivel joint comprises a downwardly projecting cylindrical pilot on said hopper portion of said separator,
a cylindrical sleeve on said feeder valve and rotatably receiving said pilot,
an upwardly facing horizontal wall on said feeder valve,
an outwardly projecting annular flange mounted on said pilot and disposed above said wall,
a sealing ring compressed between said flange and said wall,
and inner and outer vertical flanges on said wall and said outwardly projecting flange for retaining said sealing ring.

3. The combination of claim 2, in which said clamping means comprises clamps engageable with the upper side of said outwardly projecting flange on said separator for clamping said flange downwardly against said feeder valve.

4. The combination of claim 1,
in which said upper swivel joint comprises a cylindrical pilot on said suction pipe and rotatably received within said axial outlet conduit on said separator, an annular sealing member disposed between said pilot and said outlet conduit, and upper and lower flanges on said pilot and said conduit for retaining and confining said sealing member.

5. The combination of claim 1,
in which said upper swivel joint comprises a cylindrical pilot on said suction pipe and rotatably received within said outlet conduit of said separator,
a packing ring disposed between said pilot and said conduit,
a lower flange projecting inwardly from said conduit and supporting said packing ring,
a lower intermediate flange projecting outwardly from said pilot and engaging the upper side of said packing ring,
a sealing gasket mounted on said separator and engaging the upper side of said lower intermediate flange,
an upper intermediate flange projecting outwardly from said pilot,
an upper inwardly projecting flange engaging the upper side of said upper intermediate flange,
and means for clamping said upper flange downwardly to cause compression of said packing ring.

6. The combination of claim 1,
in which said upper swivel joint comprises a cylindrical pilot on said suction pipe and rotatably received within said outlet conduit of said separator,
a packing ring disposed between said pilot and said conduit,
a lower flange projecting inwardly from said conduit and supporting said packing ring,
an outwardly projecting flange on said pilot and engaging the upper side of said packing ring,
means for pressing said pilot downwardly to compress said packing ring between said flanges,
and a sealing gasket on said separator and engaging the upper side of said inwardly projecting flange on said pilot.

References Cited by the Examiner
UNITED STATES PATENTS

| | | | |
|---|---|---|---|
| 1,407,510 | 2/22 | Bentham | 302—34 |
| 2,162,019 | 6/39 | Johnson | 302—34 |
| 2,622,936 | 12/52 | Diebold | 302—34 |
| 2,837,377 | 6/58 | Finnegan | 302—23 |
| 2,878,508 | 3/59 | Sedgwick | 302—34 |

SAMUEL F. COLEMAN, *Primary Examiner.*

ANDRES H. NIELSEN, *Examiner.*